(12) United States Patent
Tu et al.

(10) Patent No.: US 12,726,447 B2
(45) Date of Patent: Sep. 1, 2026

(54) DUAL MODE QOS

(71) Applicant: Mellanox Technologies, Ltd., Yokneam (IL)

(72) Inventors: Chengchun Tu, Sammamish, WA (US); Daniel T Jurgens, Austin, TX (US); Bodong Wang, Austin, TX (US)

(73) Assignee: Mellanox Technologies, Ltd, Yokneam (IL)

(*) Notice: Subject to any disclaimer, the term of this patent is extended or adjusted under 35 U.S.C. 154(b) by 204 days.

(21) Appl. No.: 18/652,825

(22) Filed: May 2, 2024

(65) Prior Publication Data

US 2025/0343766 A1 Nov. 6, 2025

(51) Int. Cl.

| | |
|---|---|
| ***H04L 47/625*** | (2022.01) |
| ***H04L 47/20*** | (2022.01) |
| ***H04L 47/32*** | (2022.01) |
| ***H04L 47/50*** | (2022.01) |
| ***H04L 47/6295*** | (2022.01) |

(52) U.S. Cl.
CPC ............ *H04L 47/627* (2013.01); *H04L 47/20* (2013.01); *H04L 47/32* (2013.01); *H04L 47/58* (2013.01); *H04L 47/6295* (2013.01)

(58) Field of Classification Search
CPC ....... H04L 47/627; H04L 47/20; H04L 47/32; H04L 47/58; H04L 47/6295
See application file for complete search history.

(56) References Cited

U.S. PATENT DOCUMENTS 6,751,663 B1 6/2004 Farrell et al.
6,970,426 B1 * 11/2005 Haddock ................ H04L 47/31 370/252
7,554,907 B1 * 6/2009 Epps .................. H04L 49/9078 370/252
7,640,355 B1 * 12/2009 Marshall ................ H04L 47/50 370/395.42

(Continued)

FOREIGN PATENT DOCUMENTS

WO 2020212308 A1 10/2020

OTHER PUBLICATIONS

Parekh et al A Generalized Processor Sharing Approach to Flow Control in Integrated Services Networks: The Single-Node Case, IEEE/ACM Transactions on Networki]'(G, vol. I, No. 3, Jun. 1993 (Year: 1993).*

(Continued)

*Primary Examiner* — David R Lazaro
*Assistant Examiner* — Robert A Shaw
(74) *Attorney, Agent, or Firm* — Meitar Patents LTD.; Daniel Kligler

(57) ABSTRACT

In one embodiment, a network device includes a network interface to receive packets over a packet data network, packet processing circuitry to manage a multiplex network receive queue, and including a policer to provide queue fairness for a plurality of network flows competing for access to the multiplex network receive queue, and including meters to label the received packets, and selectively operate in (a) a two-level mode with two-levels of the meters, and (b) a single-level mode with a single one of the meters, and queueing logic to add some of the received packets to the multiplex network receive queue and drop others of the received packets responsively to labelling of the packets by the meters.

18 Claims, 7 Drawing Sheets

(56) References Cited

U.S. PATENT DOCUMENTS 7,787,472 B2 8/2010 Washburn et al.
8,045,470 B2 10/2011 Zseby
8,705,365 B1 4/2014 Martin et al.
8,856,518 B2 10/2014 Sridharan et al.
9,331,947 B1 5/2016 O'Keeffe et al.
9,450,881 B2 9/2016 Dumitrescu et al.
9,942,158 B2 4/2018 Shetty et al.
10,181,987 B2 1/2019 Grandham et al.
10,237,354 B2 3/2019 Jani
10,341,263 B2 7/2019 Zou et al.
10,432,745 B2 10/2019 Daly et al.
10,680,964 B1 6/2020 Kadosh et al.
10,924,418 B1 2/2021 Gudibanda et al.
11,310,163 B1 4/2022 Lo et al.
11,470,007 B2 10/2022 Urman et al.
11,516,135 B2 11/2022 Aibester et al.
11,558,304 B2 1/2023 Lo et al.
11,621,920 B2 4/2023 Urman et al.
2002/0071398 A1* 6/2002 Moran .................... H04L 47/10 370/252
2003/0152084 A1* 8/2003 Lee ......................... H04L 12/56 370/395.5
2004/0081095 A1 4/2004 Liu et al.
2005/0078602 A1* 4/2005 Mancour ................. H04L 47/31 370/235
2005/0160180 A1* 7/2005 Rabje ...................... H04L 47/32 709/238
2006/0087969 A1* 4/2006 Santiago ................. H04L 47/10 370/389
2006/0159019 A1* 7/2006 Buskirk .................. H04L 47/32 370/235
2006/0221819 A1 10/2006 Padwekar
2006/0239194 A1* 10/2006 Chapell ................... H04L 47/50 370/235
2008/0056268 A1* 3/2008 Washburn ............... H04L 47/20 370/394
2009/0109847 A1* 4/2009 Stephenson ............. H04L 47/20 370/232
2010/0150004 A1 6/2010 Duffield et al.
2010/0195504 A1* 8/2010 Nandagopal ............ H04L 47/20 370/235.1
2010/0271946 A1* 10/2010 Davari ................ H04L 47/2458 370/232
2011/0080886 A1 4/2011 Chandrachood et al.
2011/0096666 A1* 4/2011 Davari .................... H04L 47/10 370/235
2012/0054363 A1 3/2012 Hart
2012/0170450 A1* 7/2012 Alleyne .................. H04L 47/31 370/230
2012/0170452 A1* 7/2012 Alleyne .................. H04L 47/20 370/230
2014/0140234 A1* 5/2014 Briscoe ................... H04L 47/17 370/252
2015/0006755 A1 1/2015 Turlington et al.
2015/0016266 A1* 1/2015 Dumitrescu ............ H04L 47/60 370/236
2015/0085694 A1 3/2015 Agarwal et al.
2016/0262073 A1 9/2016 Muley et al.
2017/0177222 A1 6/2017 Singh et al.
2017/0230301 A1* 8/2017 Szymanski ............. H04L 47/30
2017/0302467 A1* 10/2017 Liu ....................... H04W 28/14
2019/0058641 A1 2/2019 Mirzazad Barijough et al.
2019/0215277 A1* 7/2019 Dhanoa ................... H04L 47/58
2020/0145345 A1* 5/2020 Finkelstein ............. H04L 47/58
2020/0358674 A1 11/2020 Harikrishnan et al.
2021/0084530 A1 3/2021 Song et al.
2021/0117360 A1 4/2021 Kutch et al.
2022/0368639 A1 11/2022 Aibester et al.
2024/0291766 A1 8/2024 Shalom et al.

OTHER PUBLICATIONS

Parekh et al, A Generalized Processor Sharing Approach to Flow Control in Integrated Services Networks: The Multiple Node Case, IEEEIACM Transactions on Networking. vol 2. No. 2, Apr. 1994 (Year: 1994).*

Heinanen et al., "A Single Rate Three Color Marker," Request for Comments (RFC) 2697, The Internet Society, pp. 1-7, Sep. 1999.

Heinanen et al., "A Two Rate Three Color Marker," Request for Comments (RFC) 2698, The Internet Society, pp. 1-6, Sep. 1999.

Hahne et al., "Dynamic Queue Length Thresholds for Multiple Loss Priorities," IEEE/ACM Transactions on Networking, vol. 10, No. 3, pp. 368-380, Jun. 2002.

Claise et al., "Specification of the IP Flow Information Export (IPFIX) Protocol for the Exchange of Flow Information," Request for Comments (RFC) 7011, Internet Engineering Task Force (IETF), pp. 1-77, Sep. 2013.

Aboul-Magd et al., "A Differentiated Service Two-Rate, Three-Color Marker with Efficient Handling of in-Profile Traffic," Request for Comments (RFC) 4115, The Internet Society, pp. 1-6, year 2005.

U.S. Appl. No. 18/113,100 Office Action dated Nov. 26, 2024.

* cited by examiner 10
12
HOST DEVICE
PROCESSOR
16
VM1
VM2
22
20
18
HOST MEMORY
24
MULTIPLEX NETWORK RECEIVE QUEUE
NETWORK INTERFACE CONTROLLER
28
PACKET PROCESSING CIRCUITRY
38
14
POLICER
QUEUEING LOGIC
48
LEVEL 2 METER
40,42
40,44
LEVEL 1 METER
46
LEVEL 1 METER
26
NETWORK INTERFACE
30
PACKETS
PACKETS
30
REMOTE NODE 1
REMOTE NODE 2
32
34
36

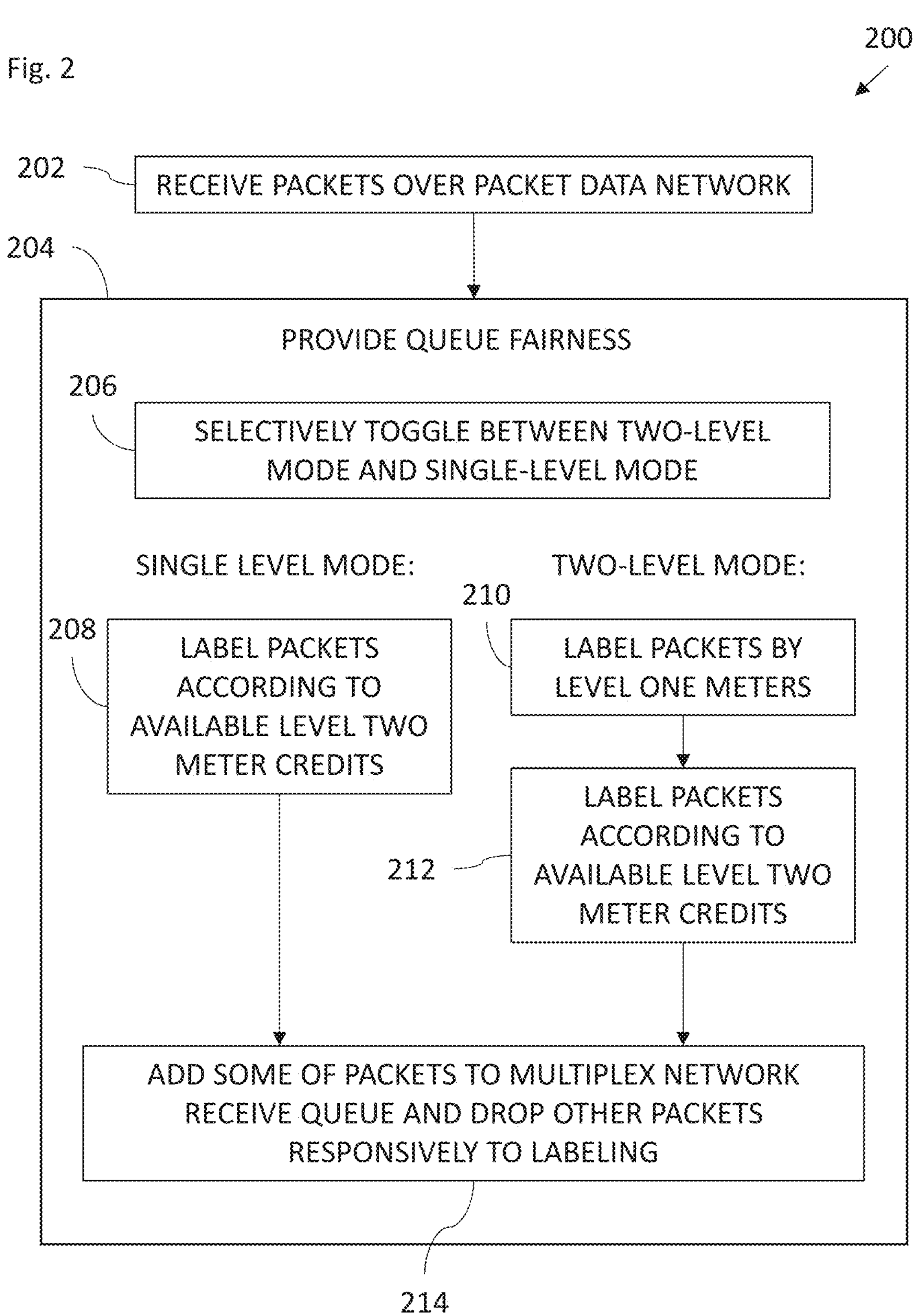
Fig. 2
200
202
RECEIVE PACKETS OVER PACKET DATA NETWORK
204
PROVIDE QUEUE FAIRNESS
206
SELECTIVELY TOGGLE BETWEEN TWO-LEVEL MODE AND SINGLE-LEVEL MODE
SINGLE LEVEL MODE:
TWO-LEVEL MODE:
208
LABEL PACKETS ACCORDING TO AVAILABLE LEVEL TWO METER CREDITS
210
LABEL PACKETS BY LEVEL ONE METERS
212
LABEL PACKETS ACCORDING TO AVAILABLE LEVEL TWO METER CREDITS
ADD SOME OF PACKETS TO MULTIPLEX NETWORK RECEIVE QUEUE AND DROP OTHER PACKETS RESPONSIVELY TO LABELING
214

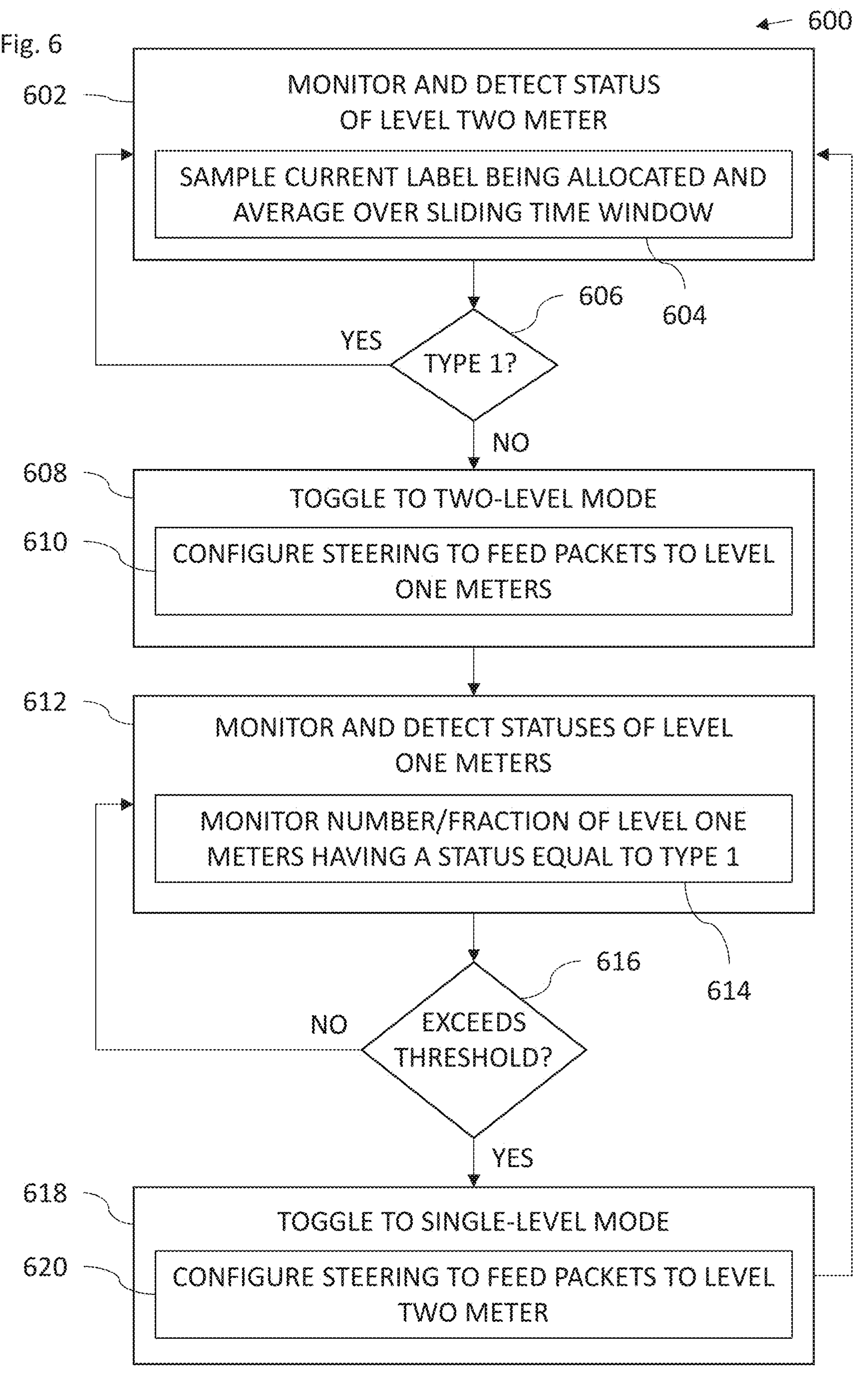
600
Fig. 6
602
MONITOR AND DETECT STATUS OF LEVEL TWO METER
SAMPLE CURRENT LABEL BEING ALLOCATED AND AVERAGE OVER SLIDING TIME WINDOW
604
606
YES
TYPE 1?
NO
608
TOGGLE TO TWO-LEVEL MODE
610
CONFIGURE STEERING TO FEED PACKETS TO LEVEL ONE METERS
612
MONITOR AND DETECT STATUSES OF LEVEL ONE METERS
MONITOR NUMBER/FRACTION OF LEVEL ONE METERS HAVING A STATUS EQUAL TO TYPE 1
614
616
NO
EXCEEDS THRESHOLD?
YES
618
TOGGLE TO SINGLE-LEVEL MODE
620
CONFIGURE STEERING TO FEED PACKETS TO LEVEL TWO METER

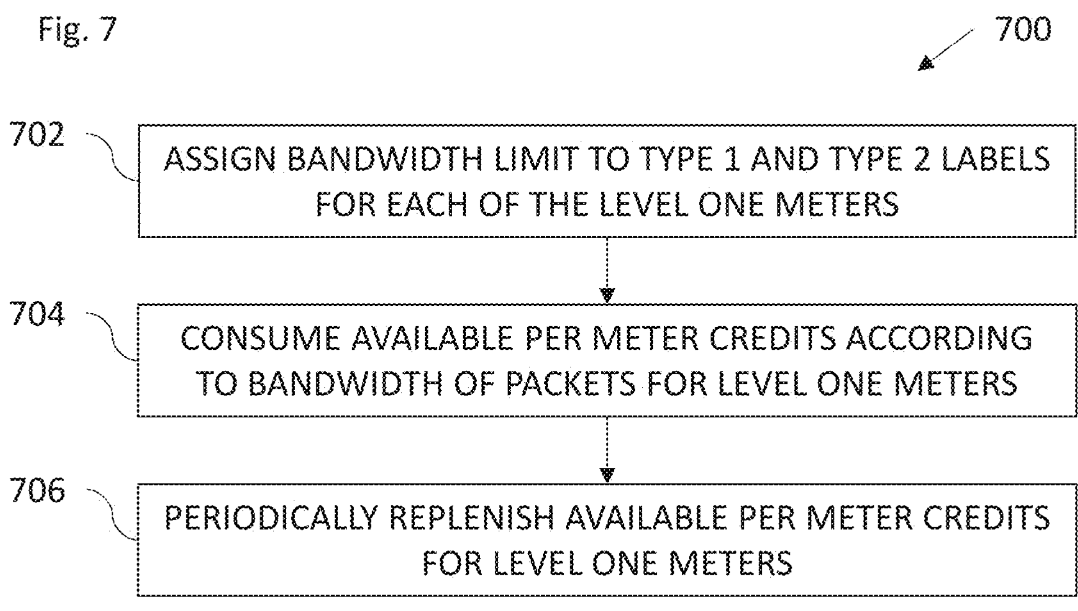
Fig. 7
700
702
ASSIGN BANDWIDTH LIMIT TO TYPE 1 AND TYPE 2 LABELS FOR EACH OF THE LEVEL ONE METERS
704
CONSUME AVAILABLE PER METER CREDITS ACCORDING TO BANDWIDTH OF PACKETS FOR LEVEL ONE METERS
706
PERIODICALLY REPLENISH AVAILABLE PER METER CREDITS FOR LEVEL ONE METERS

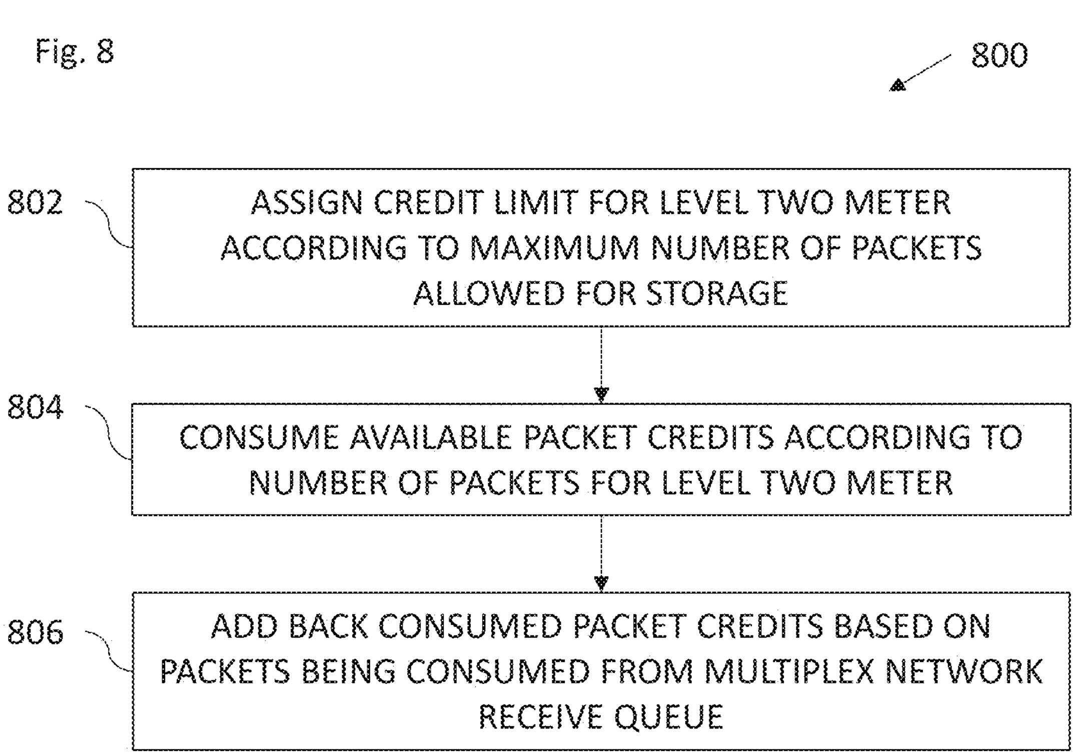
Fig. 8
800
802
ASSIGN CREDIT LIMIT FOR LEVEL TWO METER ACCORDING TO MAXIMUM NUMBER OF PACKETS ALLOWED FOR STORAGE
804
CONSUME AVAILABLE PACKET CREDITS ACCORDING TO NUMBER OF PACKETS FOR LEVEL TWO METER
806
ADD BACK CONSUMED PACKET CREDITS BASED ON PACKETS BEING CONSUMED FROM MULTIPLEX NETWORK RECEIVE QUEUE

DUAL MODE QOS

FIELD OF THE DISCLOSURE

The present disclosure relates to computer systems, and in particular, but not exclusively, to providing queue fairness.

BACKGROUND

In the producer-consumer software model, there are two entities, a producer and consumer. The producer produces objects, e.g., items in a queue, and the consumer consumes the objects, e.g., the items from the queue. Providing a separate queue for each producer-consumer pair provides a fair solution. However, the memory footprint of the queues grows linearly with the number of consumers.

A solution to the above problem is to provide a queue shared by a number of producers and consumers, thereby reducing the memory footprint. However, the shared queue leads to a problem of fairness in which the consumers compete for use of the queue as heavy producers exclude light producers from adding to the queue based on the high volume of objects provided by one or more of the producers.

SUMMARY

There is provided in accordance with an embodiment of the present disclosure, a network device, including a network interface to receive packets over a packet data network, packet processing circuitry to manage a multiplex network receive queue, and including a policer to provide queue fairness for a plurality of network flows competing for access to the multiplex network receive queue, and including meters to label the received packets, and selectively operate in (a) a two-level mode with two-levels of the meters, and (b) a single-level mode with a single one of the meters, and queueing logic to add some of the received packets to the multiplex network receive queue and drop others of the received packets responsively to labeling of the packets by the meters.

Further in accordance with an embodiment of the present disclosure the policer is to selectively toggle between the two-level mode and the single-level mode.

Still further in accordance with an embodiment of the present disclosure in the two-level mode, the two-levels of meters include level one meters to receive first packets from the network interface and label the first packets, and a level two meter to receive at least some of the labeled first packets from the level one meters and relabel the at least some labeled first packets, in the single-level mode, the level two meter is to receive second packets from the network interface and label the second packets, and the queueing logic is to add ones of the first packets and the second packets labeled with a first label-type or a second label-type to the multiplex network receive queue and drop ones of the first packets and the second packets labeled with a third label-type.

Additionally in accordance with an embodiment of the present disclosure the packet processing circuitry is to configure packet steering to feed the first packets into the level one meters the network flows when toggling from operating in the single-level mode to operating in the two-level mode.

Moreover, in accordance with an embodiment of the present disclosure the meters are to label the packets three label-types based on available per meter credits for the first label-type and the second label-type.

Further in accordance with an embodiment of the present disclosure the packet processing circuitry is to consume the available per meter credits a bandwidth of the packets for the level one meters, periodically replenish the available per meter credits for the level one meters, consume the available packet credits a number of the packets for the level two meter, and add back consumed ones of the packet credits responsively to respective ones of the packets being consumed from the multiplex network receive queue.

Still further in accordance with an embodiment of the present disclosure the packet processing circuitry is to assign a bandwidth limit to the first label-type and the second label-type for each of the level one meters a bandwidth limit of the multiplex network receive queue.

Additionally in accordance with an embodiment of the present disclosure the level two meter has a status equal to the first label type or the second label type or the third label type, and the packet processing circuitry is to toggle the policer from operating in the single-level mode to operating in the two-level mode responsively to detecting that the status of the level two meter is the second label type or the third label type.

Moreover, in accordance with an embodiment of the present disclosure the packet processing circuitry is to detect the status of the level two meter by sampling a current label being allocated by the level two meter and averaging over a sliding time window.

Further in accordance with an embodiment of the present disclosure the packet processing circuitry is to toggle the policer from operating in the two-level mode to operating in the single-level mode responsively to a given number or given fraction of the level one meters have a status equal to the first label type.

There is also provided in accordance with another embodiment of the present disclosure, a networking method, including receiving packets over a packet data network, managing a multiplex network receive queue, providing queue fairness for a plurality of network flows competing for access to the multiplex network receive queue using a policer including meters, labelling by the meters the received packets, selectively operating in (a) a two-level mode with two-levels of the meters, and (b) a single-level mode with a single one of the meters, adding some of the received packets to the multiplex network receive queue, and dropping others of the received packets responsively to the labeling of the packets.

Still further in accordance with an embodiment of the present disclosure, the method includes selectively toggling between the two-level mode and the single-level mode.

Additionally in accordance with an embodiment of the present disclosure, the method includes in the two-level mode receiving by level one meters first packets from a network interface and labeling the first packets, and receiving by a level two meter at least some of the labeled first packets from the level one meters and relabeling the at least some labeled first packets, in the single-level mode receiving by the level two meter second packets from the network interface and labeling the second packets, and adding ones of the first packets and the second packets labeled with a first label-type or a second label-type to the multiplex network receive queue and dropping ones of the first packets and the second packets labeled with a third label-type.

Moreover, in accordance with an embodiment of the present disclosure, the method includes configuring packet steering to feed the first packets into the level one meters the network flows when toggling from operating in the single-level mode to operating in the two-level mode.

Further in accordance with an embodiment of the present disclosure, the method includes labeling the packets three label-types based on available per meter credits for the first label-type and the second label-type.

Still further in accordance with an embodiment of the present disclosure, the method includes consuming the available per meter credits a bandwidth of the packets for the level one meters, periodically replenishing the available per meter credits for the level one meters, consuming available packet credits a number of the packets for the level two meter, and adding back consumed ones of the packet credits responsively to respective ones of the packets being consumed from the multiplex network receive queue.

Additionally in accordance with an embodiment of the present disclosure, the method includes assigning a bandwidth limit to the first label-type and the second label-type for each of the level one meters a bandwidth limit of the multiplex network receive queue.

Moreover, in accordance with an embodiment of the present disclosure the level two meter has a status equal to the first label type or the second label type or the third label type, the method further including toggling the policer from operating in the single-level mode to operating in the two-level mode responsively to detecting that the status of the level two meter is the second label type or the third label type.

Further in accordance with an embodiment of the present disclosure, the method includes detecting the status of the level two meter by sampling a current label being allocated by the level two meter and averaging over a sliding time window.

Still further in accordance with an embodiment of the present disclosure, the method includes toggling the policer from operating in the two-level mode to operating in the single-level mode responsively to a given number or given fraction of the level one meters have a status equal to the first label type.

BRIEF DESCRIPTION OF THE DRAWINGS

The present disclosure will be understood from the following detailed description, taken in conjunction with the drawings in which:

FIG. 2 is a flowchart including steps in a queue fairness method in the system of FIG. 1;

FIG. 6 is a flowchart including steps in a method to determine a mode of operation of the policer in the system of FIG. 1;

FIG. 7 is a flowchart including steps in a method of credit usage for level-1 meters in the system of FIG. 1; and FIG. 8 is a flowchart including steps in a method of credit usage for a level-2 meter in the system of FIG. 1.

DESCRIPTION OF EXAMPLE EMBODIMENTS

Overview

Figure 1:
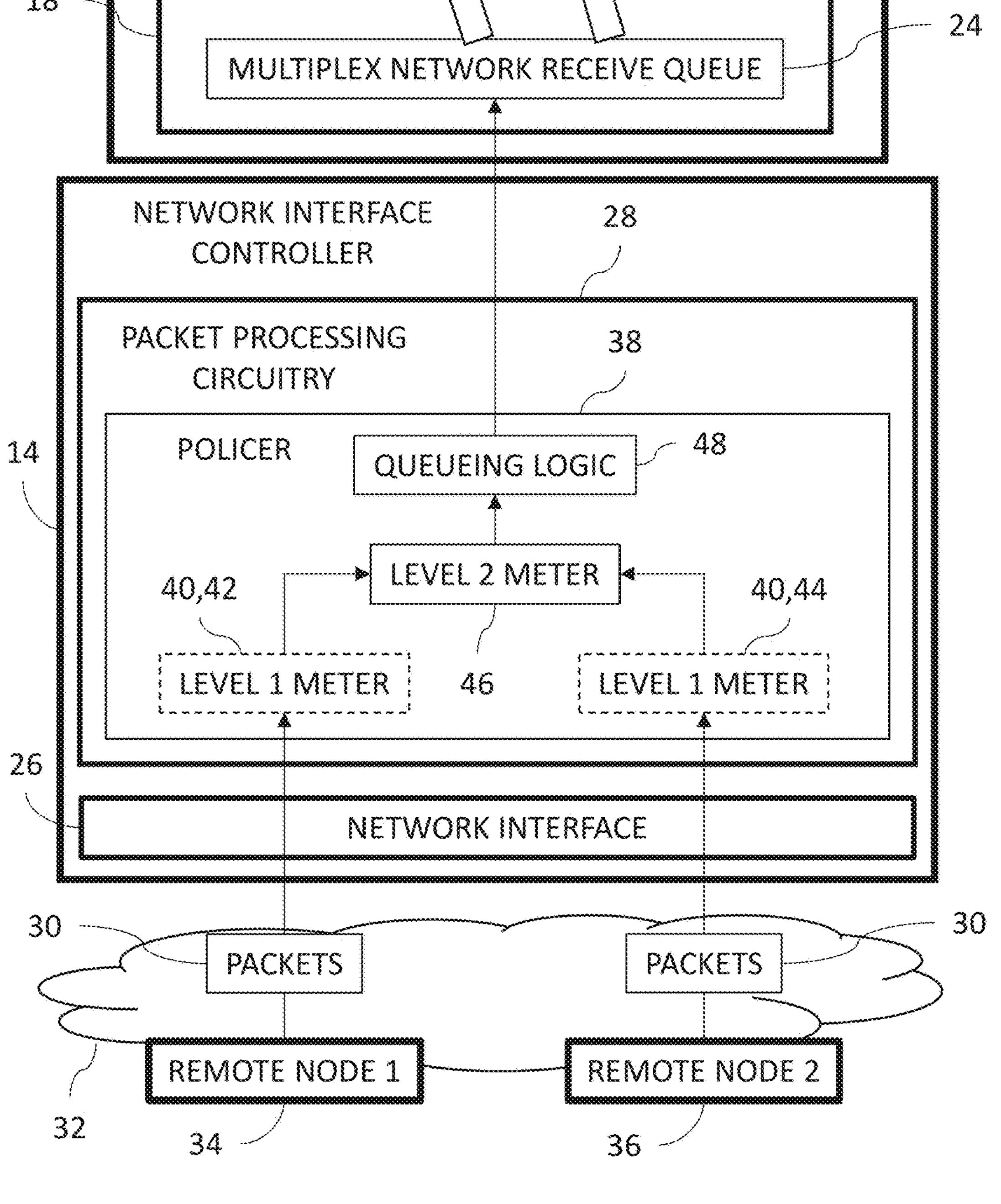
FIG. 1 is a block diagram view of a computer system constructed and operative in accordance with an embodiment of the present disclosure.

As previously mentioned, implementing a shared queue in a producer-consumer software model may lead to a problem of fairness for the consumers. For example, when multiple virtual machines (VMs) share the same network queue there is a possibility that one of the VM connections may starve the other VMs. In that example, network connections or the VMs are considered producers and the network queue is considered the consumer. One solution is to determine when a producer is allowed to insert an object into a queue or not. In software, this may be provided using an "if" statement, for example. However, in the case of receiving packets, hardware places the packets in a receive queue. In hardware, it is harder to provide queue fairness, and the decision whether a producer is to be limited needs to be made before a packet is consumed by a consumer, e.g., before a packet is placed on the receive queue. In many cases, queue fairness is not provided using congestion control algorithms as there may not be congestion on the network. For example, a queue can hold 1 GB/s, whereas a link feeding that queue may have a bandwidth of more than 100 GB/s. Therefore, in such a case there may be no need to control the network connection, but there may be a need to control access to the queue.

Additionally, while applying fairness, the different loads on the queue should be considered. For example, if three producers are adding to the queue, then the capacity of the queue should be divided among the three producers. However, if only a single producer is adding to the queue, then most of the capacity of the queue should be allocated to that single producer.

One solution is to use a hierarchical policer to provide queue fairness for network flows competing for access to a multiplex network receive queue. The hierarchical policer may include two levels of meters. The first level may include a meter for each network flow and each meter labels incoming packets according to available label credits, so that some packets are labeled type-1 (e.g., green) according to available type-1 label credits, some packets are labeled type-2 (e.g., yellow) according to available type-2 label credits (when type-1 label credits are not available), and some packets are labeled type-3 (e.g., red) when type-1 label credits and type-2 label credits are not available. The type-3 (e.g., red) packets are dropped, and the type-1 (e.g., green) and type-2 (e.g., yellow) packets are provided as input to a meter in the second level of the hierarchical policer.

The second level meter relabels the packets, for example, according to the following logic. If the packet is already labeled type-1 (e.g., green), then that packet is relabeled type-1 (e.g., green) according to available type-1 label credits by the second level meter. In this context the term "relabel" may include actually relabeling the packet with a new label or validating the previous labeling of the packet. The second level meter label credits may be configured so that type-1 (e.g., green) packets arriving at the second level meter remain type-1 (e.g., green) packets. However, in some embodiments, according to the logic of the second level meter, if for some reason no type-1 label credits are available in the second level meter, a type-1 (e.g., green) packet could be relabeled by the second level meter as a type-2 (e.g., yellow) packet, or even as a type-3 packet if no type-2 label credits are available.

If the packet arriving at the second level meter is already labeled type-2 (e.g., yellow), then that packet is generally relabeled type-2 (e.g., yellow) by the second level meter according to available type-2 label credits. If no type-2 label credits are available in the second level meter, the type-2 (e.g., yellow) packet could be relabeled as a type-3 by the second level meter. Packets labeled as type-1 (e.g., green) or type-2 (e.g., yellow) by the second level meter are added to the queue, whereas packets labeled as type-3 are dropped.

The initial level of type-1 label credits allocated to the second level meter may be configured to be the sum of the type-1 label credits allocated to the first level meters so that all the packets labeled as type-1 (e.g., green) remain type-1 (e.g., green) after the second level meter, thereby guaranteeing a minimum access to the queue by each of the network flows. In other words, generally all packets labeled as type-1 (e.g., green) by the first level meters will eventually be added to the queue, and some of the packets labeled as type-2 (e.g., yellow) will be added to the queue while some will be dropped.

Using two levels of meters, and three types of packet labeling, provides queue fairness when all the network flows are active. It also allows unused queue capacity to be reassigned to one or more active network flows when one or more other network flows are less active or not active at all. For example, if all network flows are active then more of the type-2 labeled packets will be relabeled by the second level meter as type-3 and dropped. However, if one or more of the network flows is less active, or inactive, then less of the type-2 labeled packets of the more active flows will be relabeled by the second level meter, thereby adding more of the type-2 packets to the queue.

The hierarchical policer may be configured as a bandwidth hierarchical policer wherein the label credits are bandwidth credits. For example, for any one of the meters, the type-1 label credits may be initially set to equal X GB (Giga Bytes) and type-2 label credits may initially be set to equal Y GB. The label credits may be consumed against the size of the packets. For example, if a packet has a size A, and that packet is labeled as a type-1 label, then the type-1 label credits are reduced by A. The label credits are replenished on a periodic basis, for example by adding back X GB per second to the type-1 label credits, and Y GB per second to the type-2 label credits.

The hierarchical policer may be configured as a token hierarchical policer wherein the label credits are equal to a number of packets or a number of places in the queue. For example, for one of the meters, the type-1 label credits may be initially set to equal X packets and type-2 label credits may initially be set to equal Y packets. The label credits may be consumed against the number of packets. For example, if a packet is labeled according to a type-1 label, then the type-1 label credits are reduced by 1. The label credits are replenished based on the packets being consumed from the queue, e.g., by software running on a host device.

A drawback of bandwidth label credits is that they do not represent the actual state of the buffer which stores the queue. An advantage of bandwidth label credits is that they can be easily managed, e.g., in hardware. While packet-based label credits accurately represent the actual state of the buffer (e.g., the space in the buffer) wherein for each packet consumed, software running on a host device replenishes one token to the available label credits, the operation of the software is slow.

Embodiments of the present disclosure address at least some of the above drawbacks by providing a device with a policer including meters to label received packets, and selectively operate in: (a) a two-level mode with two-levels of meters; and (b) a single-level mode with a single meter.

In the two-level mode, each meter in the bottom level (i.e., first level or level 1) receives packets of a respective network flow or VM from a network interface (i.e., each meter is associated with its own network flow), labels the packets according to available per-meter label credits, and passes labeled packets to a single meter in the upper level (i.e., second level or level 2). Some of the labeled packets may be dropped according to their labeling. The single meter receives labeled packets from the network interface, relabels the packets according to the available label credits for the single meter, and passes the labeled packets to queuing logic, described in more detail below.

In the single-level mode, the single meter receives packets from the network interface, labels the packets according to the available label credits, and passes the labeled packets to queuing logic.

The queueing logic adds some received packets to a multiplex network receive queue and drops other received packets responsively to labeling of the packets by the meters. The labeling and dropping logic may be similar to that described previously above.

Selectively operating in the single-level mode or the two-level mode allows for simplified processing in the single-level mode when the load of the network flows is light, while allowing fairness to be applied among the network flows when the load is heavy and some of the packets need to be dropped.

In some embodiments, the meter in the top level (level 2) of the policer is operated with packet-based label credits (e.g., by software) thereby matching the actual state of the buffer to which the packets exiting the level 2 meter will directly flow (if the packets are not dropped), and each meter in the bottom level (level 1) of the policer is operated with per meter bandwidth label credits which are simpler to implement (e.g., in hardware).

As previously mentioned, the policer toggles between operating in the single-level mode or the two-level mode according to the needs of the system. If the policer is operating in the single-level mode, the policer may toggle to the two-level mode when the status of the level-2 meter changes from type-1 (e.g., green) to type-2 (e.g., yellow) or type-3 (e.g., red). The status of the level 2 meter may be determined based on current packet labeling being applied by the meter. For example, if the current packet labeling is type-1, then the status of the level 2 meter will be type-1. However, as the packet flow may be bursty, the status of the level 2 meter may change too rapidly and result in rapidly toggling back-and-forth between single-level mode and two-level mode. Therefore, in some embodiments, the status of the level 2 meter (or level 1 meter(s)) may be checked using sampling and averaged over a sliding window to determine the status of the level 2 meter (or level 1 meter(s)). Toggling from the single-level mode to the two-level mode may involve configuring packet steering to first forward received packets of respective flows to respective level 1 meters (e.g., flow-specific meters). The bandwidth allocation to each level 1 meter is also assigned. For example, if it is detected that the maximum bandwidth capacity of the multiplex network receive queue 24 is about 100 Mpps (mega packets per second) then this limit may be divided among the level 1 meters. E.g., if there are two level-1 meters, each level 1 meter could be assigned 50 Mpps, with 45 Mpps for type-1 and 5 for type-2, for example. The bandwidth may be assigned unevenly among the level 1 meters, e.g., according to consumer requirements, such as assigning more bandwidth to control traffic.

If the policer is operating in the two-level mode, the policer may toggle to the single-level mode based on the status of the level 1 meters. For example, if a given percentage or fraction of the level 1 meters have a status of label type 1 (e.g., green) then the policer may toggle back to the single-level mode of operation. Toggling from the two-level mode to the single-level mode may involve configuring packet steering to forward received packets of all flows to the level 2 meter. The packet-based label credits are assigned to the level 2 meter according to the buffer capacity. Packet-based label credits are then assigned to type-1 label credits and type-2 label credits. For example, 90% of the packet-based label credits may be assigned to type-1 label credits and 10% of the packet-based label credits may be assigned to type-2 label credits.

System Description

Reference is now made to FIG. 1, which is a block diagram view of a computer system 10 constructed and operative in accordance with an embodiment of the present disclosure.

The system 10 includes a host device 12 and a network device such as a network interface controller 14. In some embodiments, the network interface controller 14 may be replaced by any suitable network device. The host device 12 includes a processor 16 and a host memory 18. The processor 16 may be configured to run virtual machines (VMs), including a VM 20 and a VM 22. The host memory 18 may store a multiplex network receive queue 24, described in more detail below.

The network interface controller 14 includes a network interface 26 and packet processing circuitry 28. The network interface 26 and the packet processing circuitry 28 may be implemented using one or more application-specific integrated circuits (ASICs). The network interface 26 is configured to receive packets 30 over a packet data network 32 from remote nodes, such as a remote node 34 and a remote node 36. The packets 30 received from remote node 34 represent one network flow, and the packets 30 received from remote node 36 represent another network flow. A "network flow" is typically identified by the values of a specified set of header fields, such as the IP and TCP/UDP 5-tuple of source and destination addresses, source and destination ports, and protocol, or any suitable flow information such as layer 2, 3, 4 or tunnel data, which are consistent over all of the packets in the flow.

The packet processing circuitry 28 is configured to process the packets 30 received from the remote nodes and manage the multiplex network receive queue 24. The packet processing circuitry 28 may include a physical (PHY) layer unit, a MAC unit, and a policer 38 to provide queue fairness for the network flows competing for access to the multiplex network receive queue 24.

The policer 38 is configured to provide queue fairness for the network flows so that each of the network flows competing for access to the multiplex network receive queue 24 is provided at least a minimal access to the multiplex network receive queue 24. The policer 38 includes multiple meters 40, 46 to label the received packets and is configured to selectively operate in a two-level mode with two levels of meters 40. 46, and in a single-level mode with a single meter 46.

In the two-level mode, the policer 38 may include a plurality of level-1 meters 40 to label the received packets 30 with corresponding labels selected from labels of three label-types (type-1, type-2, type-3). Labeling the packets 30 may be achieved by adding or updating flags or other data items in the headers of the packets 30. Each of the level-1 meters 40 labels packets of a corresponding network flow and each of the packets is labeled with one of the label types. FIG. 1 shows an example of two level-1 meters 40, level-1 meter 42, and level-1 meter 44. The policer 38 may include any suitable number of level-1 meters 40. The level-1 meter 42 is configured to selectively label packets 30 (from remote node 34) of one network flow according to the three label-types. The level-1 meter 44 is configured to selectively label packets 30 (from remote node 36) of another network flow according to the three label-types. Each of the packets 30 is labeled with one of the label types. The policer 38 also includes a level-2 meter 46 configured to receive at least some of the packets output by, and labeled by, the level-1 meters 40. It should be noted that packets labeled as type-3 by the level-1 meters 40 may be dropped prior to reaching the level-2 meter 46. The level-2 meter 46 is configured to relabel the packets 30 it receives. The term "relabel" as used in the specification and claims, in all grammatical forms, may include relabeling (i.e., changing a label) of a packet with a different label type, or relabeling the packet with the same label type (i.e., overwriting the existing label with the same label, or validating the existing label of the packet by leaving the existing label in place without overwriting the existing label).

In the single-level mode, the policer 38 includes level-2 meter 46 without the level-1 meters 40. Packets received by the network interface 26 are forwarded to the level-2 meter 46 for labeling according to available label credits.

Each of the meters 40, 46 has its own "pool" of label credits. The level-1 meters 40 are typically assigned bandwidth label credits while the level-2 meter 46 is typically assigned packet-based label credits, described in more detail with reference to FIGS. 7 and 8, respectively. Each meter 40, 46 labels packets as type-1, if type-1 label credits are available for that meter. If type-1 label credits are not available for that meter, that meter labels the packets as type-2, if type-2 label credits are available. If type-2 label credits are not available, the packets are labeled as type-3.

The policer 38 includes queueing logic 48 configured to add some of the received packets 30 to the multiplex network receive queue 24 and drop other received packets 30 responsively to labeling of the packets by the meters 40, 46. In some embodiments, queueing logic 48 is configured to selectively add the packets 30 labeled with a type-1 label or a type-2 label to the multiplex network receive queue 24, and drop the packets labeled with a type-3 label.

In practice, some, or all of the functions of the packet processing circuitry 28 may be combined in a single physical component or, alternatively, implemented using multiple physical components. These physical components may comprise hard-wired or programmable devices, or a combination of the two. In some embodiments, at least some of the functions of the packet processing circuitry 28 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Reference is now made to FIG. 2, which is a flowchart 200 including steps in a queue fairness method in the system 10 of FIG. 1. The network interface 26 is configured to receive packets over the packet data network 32 (block 202). The policer 38 is configured to provide queue fairness for the network flows competing for access to the multiplex network receive queue 24 (block 204). The policer 38 is configured to selectively operate in: (a) a two-level mode with two-levels of meters 40, 46; and (b) a single-level mode with a single meter 46, described in more detail below. The policer 38 is configured to selectively toggle between the two-level mode and the single-level mode (block 206), as described in more detail with reference to FIGS. 4-6.

In the single-level mode, the level-2 meter 46 is configured to receive packets 30 from the network interface 26 and label the packets 30 according to the available label credits for the level-2 meter 46 (block 208), as described above with reference to FIG. 1.

In the two-level mode, level-1 meters 40 are configured to receive packets 30 from the network interface 26 and label the received packets 30 according to available per meter label credits (block 210), as described above with reference to FIG. 1. The level-2 meter 46 is configured to receive at least some of the labeled packets 30 from the level-1 meters 40 and relabel the labeled packets received from the meters 40 according to available label credits of the level-2 meter 46 (block 212), as described above with reference to FIG. 1. In general, the meters 40, 46 are configured to label the packets according to three label-types based on available per meter label credits for the first label-type and the second label-type, as described above with reference to FIG. 1.

The packets labeled by level-2 meter 46 are forwarded to queueing logic 48, which is configured to add some of the received packets 30 to the multiplex network receive queue 24 and drop other received packets 30 responsively to labeling of the packets 30 by the meters 40, 46 (block 214). In some embodiments, the queueing logic 48 is configured to add packets labeled with label type-1 or label type-2 to the multiplex network receive queue 24 and drop packets labeled with label type-3.

Figure 3:
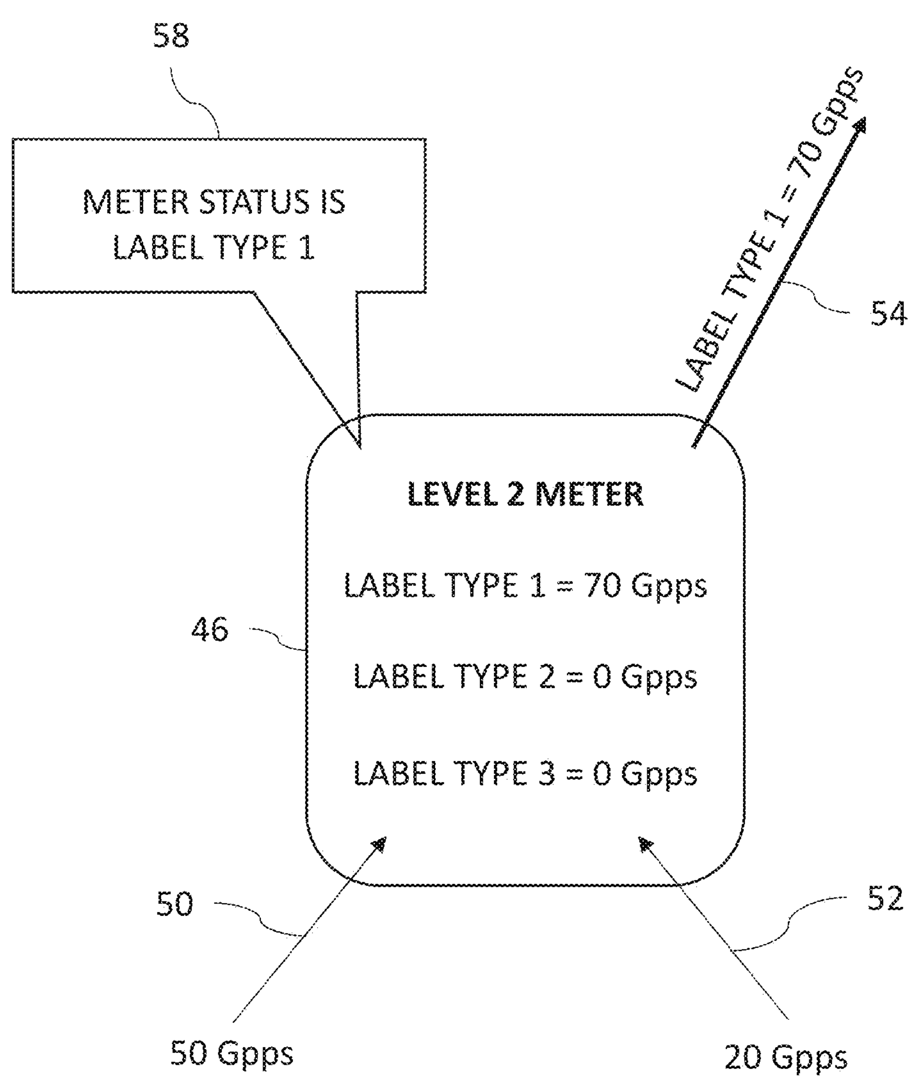
FIGS. 3 and 4 are views of a policer operating according to a single-level mode of operation in the system of FIG. 1.
Figure 4:
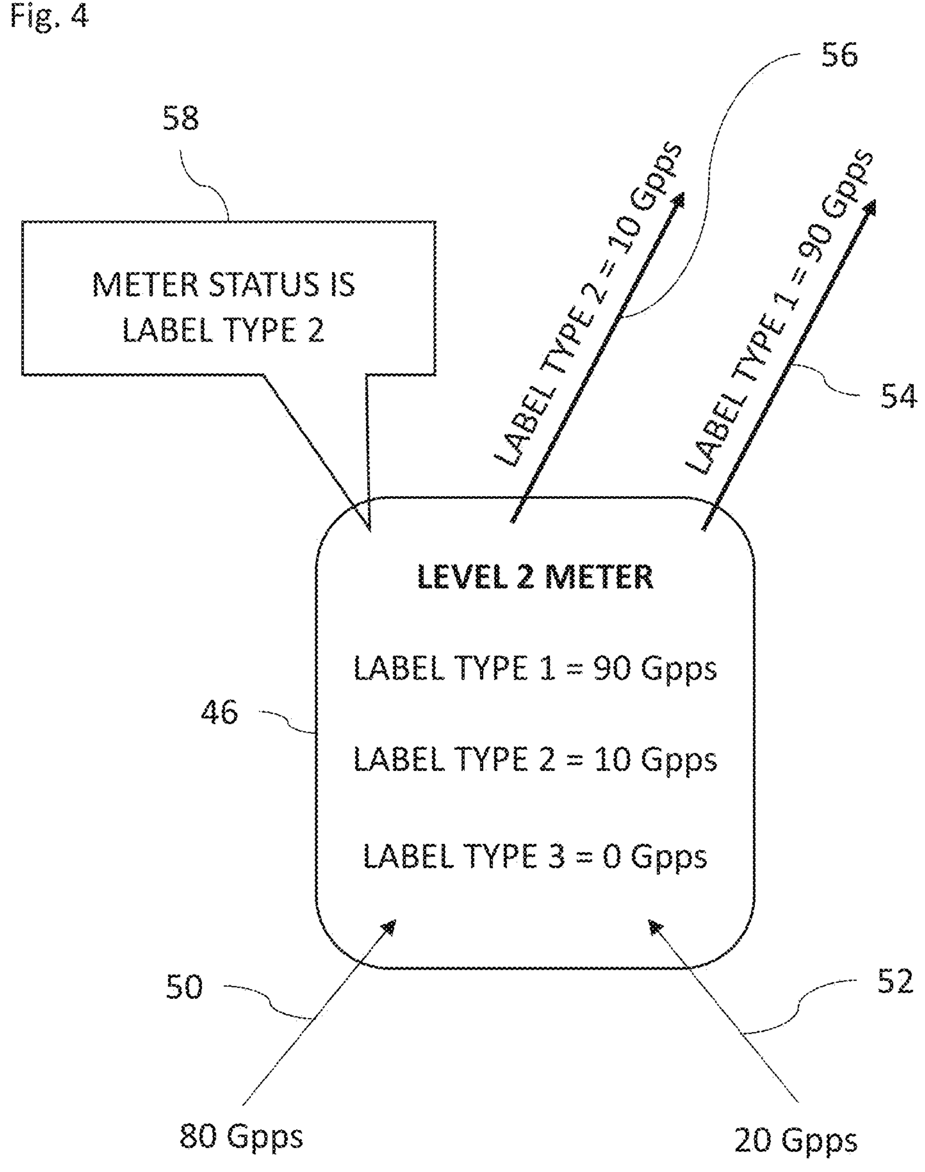

Reference is now made to FIGS. 3 and 4, which are views of policer 38 operating according to the single-level mode of operation in the system 10 of FIG. 1. FIG. 3 shows level-2 meter 46 receiving packets of two network flows 50, 52. Network flow 50 has a packet rate of 50 Gpps, while network flow 52 has a packet rate of 20 Gpps. In the example of FIG. 3, the multiplex network receive queue 24 has a capacity of X packets with 0.9X type-1 label credits, and 0.1 type-2 label credits being assigned to level-2 meter 46. Therefore, all the packets 30 received by level-2 meter 46 are labeled as type-1 and are forwarded (arrow 54) to the multiplex network receive queue 24. Additionally, the meter status is label type-1 (block 58).

FIG. 4 shows that the packet rate of one of the flows has increased from 50 Gpps to 80 Gpps. Therefore, there is a total of 100 Gpps input into level-2 meter 46. In the example of FIG. 4, approximately 90 Gpps of the packets are labeled as type-1 and approximately 10 Gpps of the packets are labeled as type-2 based on the allocated and available packet-based label credits for each label type. Therefore, the status of the level-2 meter 46 is now label type-2 (block 58). The packets labeled as type-1 are forwarded (arrow 54) to the queueing logic 48 and the packets labeled as type-2 are forwarded (arrow 56) to the queueing logic 48. As the status of level-2 meter 46 is now label type-2 (e.g., yellow), the policer 38 toggles from single-mode operation to two-mode operation, as described in the example of FIG. 5.

Figure 5:
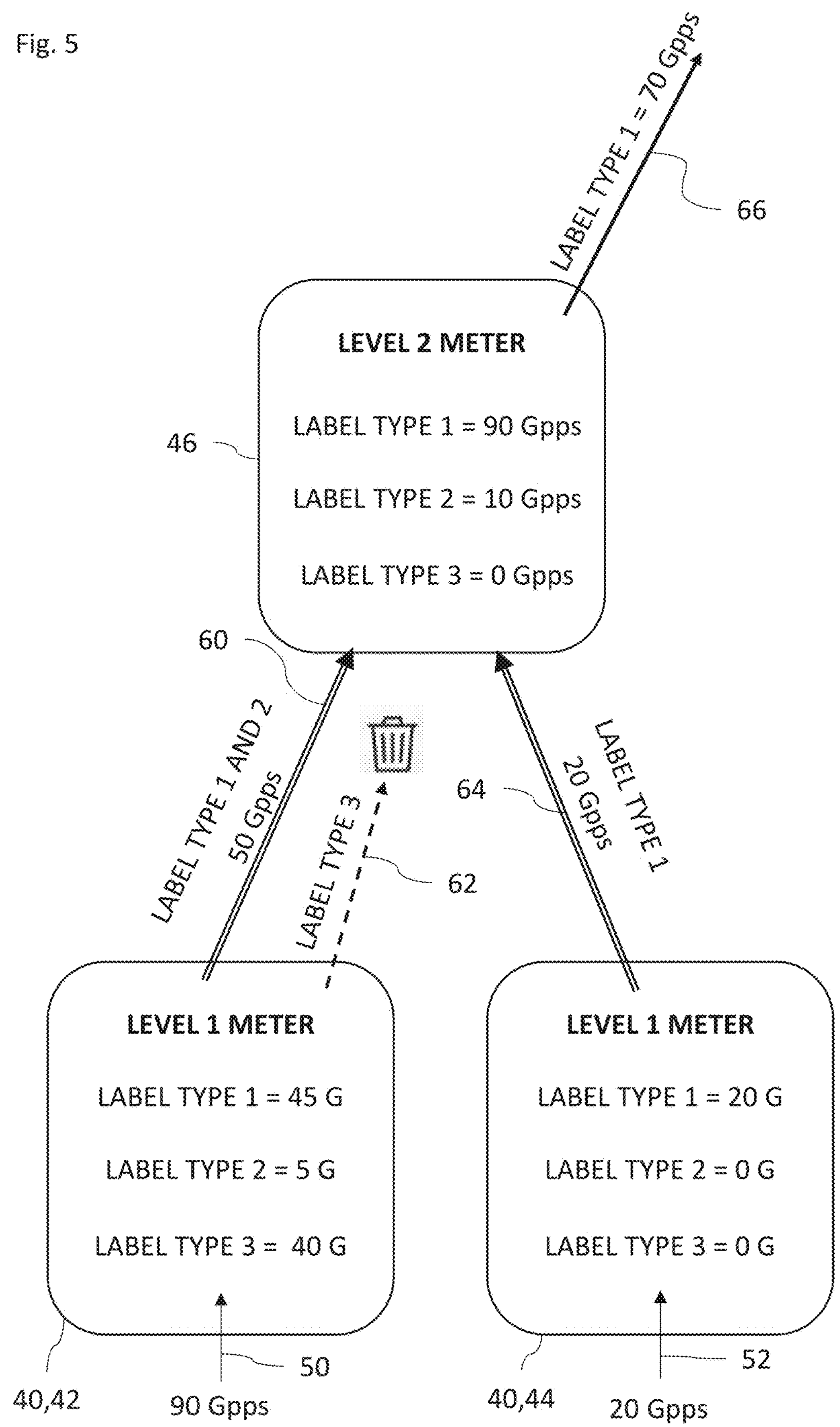
FIG. 5 is a view of a policer operating according to a two-level mode of operation in the system of FIG. 1.

Reference is now made to FIG. 5, which is a view of policer 38 operating according to the two-level mode of operation in the system 10 of FIG. 1. The policer 38 includes level-2 meter 46 and two level-1 meters 40 (including meter 42 and meter 44). FIG. 5 shows level-1 meter 42 receiving packets of network flow 50 at a packet rate of 90 Gpps, and level-1 meter 44 receiving packets of network flow 52 at a packet rate of 20 Gpps. The various label credit limits for the meters 42, 44 for each label type (e.g., type-1, type-2, etc.) are shown in the respective meters 42, 44 in FIG. 5. Therefore, meter 42 labels 50 Gpps of the packets with label type-1 or label type-2 (i.e., label 45 Gpps of packets with label type-1, and label 5 Gpps of packets with label type-2) (arrow 60), while 40 Gpps of the packets are labeled with label type-3 and are dropped (arrow 62). Meter 44 labels all the packets with label type-1 (arrow 64) as the packet rate of block 52 is within the limit of the bandwidth label credits for label type-1. Therefore, approximately 50 Gpps of packets (arrow 60) and 20 Gpps of packets (arrow 64) are received by level-2 meter 46 from meter 42 and meter 44, respectively. The level-2 meter 46 therefore labels all the received packets with label type-1 (according to the packet-based label credits shown in FIG. 5 in level-2 meter 46) and forwards 70 Gpps of packets (arrow 66) to the multiplex network receive queue 24.

Reference is now made to FIG. 6, which is a flowchart 600 including steps in a method to determine a mode of operation of policer 38 in the system 10 of FIG. 1. As described above with reference to FIGS. 3-5, each meter 40 has an associated status given by the label type that is currently being assigned by that meter 40 and may be equal to label type-1, type-2, or type-3. In order to prevent the statuses of the meters 40 changing too rapidly, the status of a given one of meters 40 may be determined by intermittently (e.g., periodically) sampling the label type currently being used by the given meter 40 to label packets and then averaging the samples over a moving window to yield the status of the given meter 40. Assuming that the policer 38 is operating in the single-level mode, the packet processing circuitry 28 is configured to monitor and detect the status of the level-2 meter 46 (block 602), for example, by sampling a current label being allocated by the level-2 meter 46 and averaging the sampled values over a sliding time window (block 604). At a decision block 606, the packet processing circuitry 28 is configured to determine if the status of the level-2 meter 46 is equal to label type-1. If the status of the level-2 meter 46 is equal to label type-1, the steps of block 602, 604, 606 are repeated intermittently. If the status of the level-2 meter 46 is not equal to label type-1 (e.g., the status is equal to label type-2 or type-3), the packet processing circuitry 28 is configured to toggle the policer 38 from operating in the single-level mode to operating in the two-level mode responsively to detecting that the status of the level-2 meter being label type-2 or type-3 (block 608). The packet processing circuitry 28 is configured to configure packet steering (operated by the packet processing circuitry 28) to feed packets 30 from the network interface 26 into the level-1 meters 40 according to the network flows (i.e., the network flows are fed to corresponding meters 40) when toggling from operating in the single-level mode to operating in the two-level mode (block 610).

While operating in the two-level mode, the packet processing circuitry 28 is configured to monitor and detect the statuses of the level-1 meters 40 (block 612). In some embodiments, the packet processing circuitry 28 is configured to monitor the number or fraction (of the total number of meters 40) of level-1 meters 40 having a status equal to type-1 (block 614). At a decision block 616, the packet processing circuitry 28 is configured to determine if the number or fraction of level-1 meters 40 having a status equal to type-1 exceeds a threshold. If the threshold is not exceeded, the steps of block 612, 614, 616 are repeated intermittently. If the threshold is exceeded, the packet processing circuitry 28 is configured to toggle the policer 38 from operating in the two-level mode to operating in the single-level mode (e.g., responsively to a given number or given fraction of the level-1 meters have a status equal to the label type-1) (block 618). The packet processing circuitry 28 is configured to configure the packet steering to feed the packets received from network interface 26 into the level-2 meter 46 (block 620).

Reference is now made to FIG. 7, which is a flowchart 700 including steps in a method of credit usage for level-1 meters 40 in the system 10 of FIG. 1. The packet processing circuitry 28 is configured to assign a bandwidth limit to label type-1 and type-2 label credits for each of the level-1 meters 40 according to an estimated bandwidth limit of the multiplex network receive queue 24 (block 702), and to allocate the credit limits among type-1 and type-2 label credits for each meter 40. For example, if it is detected that the maximum bandwidth of the multiplex network receive queue 24 is 100 Mpps (mega packets per second) then this limit may be divided among the level 1 meters 40. For example, if there are two level 1 meters 40, each meter 40 could be assigned 50 Mpps, with 45 Mpps for type-1 label credits and 5 Mpps for type-2 label credits. The bandwidth may be assigned unevenly among the level 1 meters 40, e.g., according to consumer requirements, such as assigning more bandwidth to control traffic. The packet processing circuitry 28 is configured to: consume the available per meter label credits according to a bandwidth of the packets for the level-1 meters 40 (block 704); and periodically replenish the available per meter label credits for the level-1 meters (block 706). For example, if meter 42 is assigned 45 Mpps, then the packet processing circuitry 28 replenishes the label credits for meter 42 with 45 M label credits per second. If available, type-1 label credits are consumed before type-2 label credits. Every time period, each of the type-1 and type-2 label credits are replenished.

Reference is now made to FIG. 8, which is a flowchart 800 including steps in a method of credit usage for level-2 meter 46 in the system 10 of FIG. 1. The packet processing circuitry 28 (or software running on the processor 16) is configured to assign the credit limit for level-2 meter 46 according to the maximum number of packets allowed for storage in the multiplex network receive queue 24 at any one time by the policer 38 (block 802). The packet-based label credits are assigned to level-2 meter 46 according to the buffer capacity. Packet-based label credits are then assigned to type-1 label credits and type-2 label credits. For example, 90% of the packet-based label credits may be assigned to type-1 label credits and 10% of the packet-based label credits may be assigned to type-2 label credits.

The packet processing circuitry 28 (or software running on the processor 16) is configured to consume the available label credits according to a number of the packets for level-2 meter 46 (e.g., each packet labeled by level two meter 46 uses one credit and deducts one from the available label credits) (block 804); and add back consumed ones of the label credits responsively to respective ones of the packets being consumed from the multiplex network receive queue 24 (e.g., each consumed packets adds back one credit to the available label credits) (block 806). If available, type-1 label credits are consumed before type-2 label credits. The packet processing circuitry 28 tries to add back a credit to the type-1 label credits for the level-2 meter 46. If the type-1 label credits of the level-2 meter 46 are full (i.e., at their initial value), the packet processing circuitry 28 adds back a credit to the type-2 label credits for the level-2 meter 46.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

The embodiments described above are cited by way of example, and the present disclosure is not limited by what has been particularly shown and described hereinabove. Rather the scope of the disclosure includes both combinations and sub-combinations of the various features described hereinabove, as well as variations and modifications thereof which would occur to persons skilled in the art upon reading the foregoing description and which are not disclosed in the prior art.

What is claimed is:

1. A network device, comprising:

a network interface to receive packets over a packet data network;

packet processing circuitry to manage a multiplex network receive queue, and including:

a policer to: provide queue fairness for a plurality of network flows competing for access to the multiplex network receive queue, and including meters to label the received packets, and selectively operate in: (a) a two-level mode with two-levels of the meters; and (b) a single-level mode with a single one of the meters; and automatically selectively toggle between the two-level mode and the single-level mode; and queueing logic to add some of the received packets to the multiplex network receive queue and drop others of the received packets responsively to labeling of the packets by the meters.

2. The network device according to claim 1, wherein:

in the two-level mode, the two-levels of meters include:

level one meters to receive first packets from the network interface and label the first packets; and a level two meter to receive at least some of the labeled first packets from the level one meters and relabel the at least some labeled first packets;

in the single-level mode, the level two meter is to receive second packets from the network interface and label the second packets; and the queueing logic is to add ones of the first packets and the second packets labeled with a first label-type or a second label-type to the multiplex network receive queue and drop ones of the first packets and the second packets labeled with a third label-type.

3. The network device according to claim 2, wherein the packet processing circuitry is to configure packet steering to feed the first packets into the level one meters according to the network flows when toggling from operating in the single-level mode to operating in the two-level mode.

4. The network device according to claim 2, wherein the meters are to label the packets according to three label-types based on available per meter credits for the first label-type and the second label-type.

5. The network device according to claim 4, wherein the packet processing circuitry is to:

consume the available per meter credits according to a bandwidth of the packets for the level one meters;

periodically replenish the available per meter credits for the level one meters;

consume the available packet credits according to a number of the packets for the level two meter; and add back consumed ones of the packet credits responsively to respective ones of the packets being consumed from the multiplex network receive queue.

6. The network device according to claim 5, wherein the packet processing circuitry is to assign a bandwidth limit to the first label-type and the second label-type for each of the level one meters according to a bandwidth limit of the multiplex network receive queue.

7. The network device according to claim 2, wherein:

the level two meter has a status equal to the first label type or the second label type or the third label type; and the packet processing circuitry is to toggle the policer from operating in the single-level mode to operating in the two-level mode responsively to detecting that the status of the level two meter is the second label type or the third label type.

8. The network device according to claim 7, wherein the packet processing circuitry is to detect the status of the level two meter by sampling a current label being allocated by the level two meter and averaging over a sliding time window.

9. The network device according to claim 7, wherein the packet processing circuitry is to toggle the policer from operating in the two-level mode to operating in the single-level mode responsively to a given number or given fraction of the level one meters have a status equal to the first label type.

10. A networking method, comprising:

receiving packets over a packet data network;

managing a multiplex network receive queue;

providing queue fairness for a plurality of network flows competing for access to the multiplex network receive queue using a policer including meters;

labelling by the meters the received packets;

selectively operating in: (a) a two-level mode with two-levels of the meters; and (b) a single-level mode with a single one of the meters;

automatically selectively toggling between the two-level mode and the single-level mode;

adding some of the received packets to the multiplex network receive queue; and dropping others of the received packets responsively to the labeling of the packets.

11. The method according to claim 10, further comprising:

in the two-level mode:

receiving by level one meters first packets from a network interface and labeling the first packets; and receiving by a level two meter at least some of the labeled first packets from the level one meters and relabeling the at least some labeled first packets; and in the single-level mode:

receiving by the level two meter second packets from the network interface and labeling the second packets; and adding ones of the first packets and the second packets labeled with a first label-type or a second label-type to the multiplex network receive queue and dropping ones of the first packets and the second packets labeled with a third label-type.

12. The method according to claim 11, further comprising configuring packet steering to feed the first packets into the level one meters according to the network flows when toggling from operating in the single-level mode to operating in the two-level mode.

13. The method according to claim 11, further comprising labeling the packets according to three label-types based on available per meter credits for the first label-type and the second label-type.

14. The method according to claim 13, further comprising:

consuming the available per meter credits according to a bandwidth of the packets for the level one meters;

periodically replenishing the available per meter credits for the level one meters;

consuming available packet credits according to a number of the packets for the level two meter; and adding back consumed ones of the packet credits responsively to respective ones of the packets being consumed from the multiplex network receive queue.

15. The method according to claim 14, further comprising assigning a bandwidth limit to the first label-type and the second label-type for each of the level one meters according to a bandwidth limit of the multiplex network receive queue.

16. The method according to claim 11, wherein the level two meter has a status equal to the first label type or the second label type or the third label type, the method further comprising toggling the policer from operating in the single-level mode to operating in the two-level mode responsively to detecting that the status of the level two meter is the second label type or the third label type.

17. The method according to claim 16, further comprising detecting the status of the level two meter by sampling a current label being allocated by the level two meter and averaging over a sliding time window.

18. The method according to claim 16, further comprising toggling the policer from operating in the two-level mode to operating in the single-level mode responsively to a given number or given fraction of the level one meters have a status equal to the first label type.

* * * * *